United States Patent [19]

Kotani et al.

[11] 4,292,261

[45] Sep. 29, 1981

[54] PRESSURE SENSITIVE CONDUCTOR AND METHOD OF MANUFACTURING THE SAME

[75] Inventors: Teizo Kotani; Kozo Arai; Shiomi Fukui; Masaki Nagata, all of Yokohama, Japan

[73] Assignee: Japan Synthetic Rubber Company Limited, Tokyo, Japan

[21] Appl. No.: 811,278

[22] Filed: Jun. 29, 1977

[30] Foreign Application Priority Data

Jun. 30, 1976 [JP] Japan ................................ 51-77454

May 31, 1977 [JP] Japan ................................ 52-63518

[51] Int. Cl.[3] ........................ B29C 25/00; B29C 17/00

[52] U.S. Cl. ........................................ 264/24; 252/511; 252/513; 264/108; 335/303; 335/306; 338/110; 338/114; 339/DIG. 1

[58] Field of Search ................. 264/24, 347, 236, 108; 335/303, 306; 428/900, 355; 338/110, 114; 339/DIG. 1; 148/100, 101, 103, 105, 33, 108, 31.55, 31.57; 156/244.17; 252/511, 513

[56] References Cited

U.S. PATENT DOCUMENTS

| | | | |
|---|---|---|---|
| Re. 28,595 | 10/1975 | DuRocher | 338/114 |
| 2,188,091 | 1/1940 | Baermann | 148/103 |
| 2,660,640 | 11/1953 | Wolf | 338/114 |
| 3,051,988 | 9/1962 | Baermann | 333/303 |
| 3,117,065 | 1/1964 | Wootten | 148/108 |
| 3,121,131 | 2/1964 | Blume | 428/900 |
| 3,141,050 | 7/1964 | Blume | 264/108 |
| 3,229,030 | 1/1966 | Baerman | 335/303 |
| 3,488,410 | 1/1970 | Downes | 264/24 |
| 3,507,694 | 4/1970 | Eichler et al. | 428/900 |
| 3,775,717 | 11/1973 | Braillon | 335/306 |
| 3,875,434 | 4/1975 | Harden et al. | 338/114 |
| 3,903,228 | 9/1975 | Riedl et al. | 264/108 |
| 4,021,763 | 5/1977 | Steingroever | 335/303 |

FOREIGN PATENT DOCUMENTS

| | | | |
|---|---|---|---|
| 222635 | 8/1958 | Australia | 335/303 |
| 668057 | 3/1952 | United Kingdom | 335/302 |

*Primary Examiner*—W. E. Hoag

*Attorney, Agent, or Firm*—Wyatt, Gerber, Shoup, Scobey & Badie

[57] ABSTRACT

A pressure sensitive conductor comprising an elastomer containing from 3 to 40% by volume of electrically conductive magnetic particles, which particles are dispersed in the elastomer so that high-sensitivity pressure sensitive conductor portions and insulator portions or low-sensitivity pressure sensitive conductor portions are both present therein. A method of manufacturing the pressure sensitive conductor comprises forming a sheet of a mixture containing electrically conductive magnetic particles in an elastomer, and subjecting the sheet to the action of magnetic fields before or during cross linking, thereby allowing the conductive magnetic particles to be uniformly dispersed in the sheet in a selected pattern.

15 Claims, 11 Drawing Figures

PRESSURE SENSITIVE CONDUCTOR AND METHOD OF MANUFACTURING THE SAME

This invention relates to a pressure sensitive conductor comprising electrically conductive magnetic particles dispersed in an insulating elastomer, and to a method of manufacturing such a pressure sensitive conductor.

Conventional pressure sensitive conductors (also known as "pressure sensitive resistors") comprising an electrically conductive metal powder in an insulating elastomer, are obtained by mixing the powder in the elastomer and then effecting cross linking. (For example, refer to DT-OLS No. 2409009, Japanese Patent Application Public Disclosure Nos. 158899/75 and 116996/75, etc.) According to these disclosures, the conductive metal particles are dispersed at random in the elastomer and, unless a high percentage of the conductive metal particles is added, the product will not function as a pressure sensitive conductor. A high percentage of metal particles will materially impair the physical properties of the elastomer, and pressure sensitive conductors thus obtained will have poor durability against repeated applications of pressure, appreciable permanent set and change on standing, and increased electric hysteresis.

It is well known that a conductor comprising an epoxy resin or the like mixed with a smaller proportion of carbonyl nickel or electrolytic nickel particles, when subjected to the action of magnetic fields, will exhibit a decrease of its volume resistivity. (Gule: "Study and Application of Conductive Polymers": Yokogawa Shobo Publishing Co., 1970, pp. 114–119. )

A method of cross linking an insulating elastomer while subjecting it to a uniform magnetic field during the fabrication of a pressure sensitive resistor is also known. (Japanese Patent Application Public Disclosure No. 51593/74). However, cross linking the insulator while applying a uniform magnetic field will produce a pressure sensitive conductor manifesting only limited desirable electrical characteristics. This is because the particles are merely uniformly oriented in the product, and do not have a particular pattern. Moreover, a large amount of the conductive material must be used, otherwise the product will be an insulator rather than a conductor.

It has now been found that the conductive magnetic material of a pressure sensitive article does not always need particle-to-particle contact upon subjection to compressive force or pressure in order to attain a remarkable decrease in resistance. It has also been found that under the influence of magnetic fields a pressure sensitive conductor undergoes a substantial decrease in resistance upon subjection to pressure, not only in the direction of its thickness, but also in any direction normal to the thickness directon. Further, it has been found possible to fabricate pressure sensitive conductors of varied characteristics by uniformly dispersing the magnetic particles in the article in selected patterns.

Thus, it is an object of the present invention to provide a pressure sensitive conductor comprising an insulating elastomer containing from 3 to 40% by volume of electrically conductive magnetic particles, which particles are dispersed in the elastomer in preselected patterns so that high-sensitivity pressure sensitive conductor portions and insulator portions or low-sensitivity pressure sensitive conductor (resistor) portions are both present therein.

Another object of the invention is to provide a method of manufacturing a pressure sensitive, conductive elastomer which comprises forming a sheet of a mixture comprising electrically conductive magnetic particles and an insulating elastomer, and subjecting the sheet to the action of selected magnetic fields before or during cross linking, thereby allowing the conductive magnetic particles to be uniformly dispersed in selected patterns in the sheet.

While the invention is illustrated by the following examples with reference to the accompanying drawings, it is to be understood that the invention is not liminted thereto, but may be variously embodied without departing from the spirit and scope of the invention.

FIG. 1 (I) is a fragmentary perspective view of a pressure sensitive conductor embodying the invention;

FIGS. 1 (II) and (III) are a plan view and a cross-sectional view, respectively, of a commerical electromagnetic chuck (also called an electromagnetic bench) utilized in fabricating the conductive elastomer of FIG. 1 (I);

FIGS. 1 (IV) and (V) are also a plan view and a cross-sectional view, respectively, of another type of an electromagnetic chuck used in fabricating the conductive elastomer of FIG. 1 (I);

FIGS. 1 (VI) and (VII) are views illustrating two different arrangements of magnets with respect to an elastomeric sheet containing conductive magnetic particles. Such sheets will hereinafter be referred to as conductor sheets;

FIG. 2 (I) is a fragmentary perspective view of another embodiment of a pressure sensitive conductor of the invention;

FIG. 2 (II) is a view illustrating an arrangement of magnets used to prepare the product of FIG. 2 (I);

FIG. 2 (III) and (IV) are views illustrating two different ways of arranging magnets to form conductor sheets;

FIGS. 3 (I), (II) and FIGS. 4 (I), (II) are plan views and cross-sectional views showing two different patterns of conductor and insulator portions obtained by use of pole pieces shown in FIGS. 5 (I) and (II), respectively;

FIGS. 5 (I) and (II) are perspective views of two different pole pieces to be used in practicing the invention;

FIG. 6 is a view showing how a conductor sheet is subjected to uniform magnetic fields through the pole pieces shown in FIG. 5 (I) and (II);

FIG. 7 (I) and FIG. 8 (I) are fragmentary perspective views of still other embodiments of the pressure sensitive, conductive elastomers of the invention;

FIGS. 7 (II), (III) and FIG. 8 (II) are views illustrating different ways of arranging magnets to form conductor sheets of the invention;

Figure 1A:
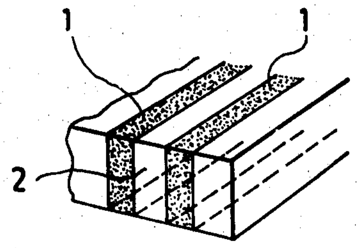
Figure 2A:
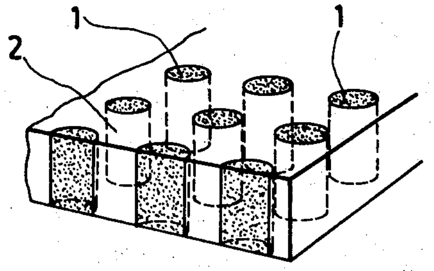
Figure 1B:
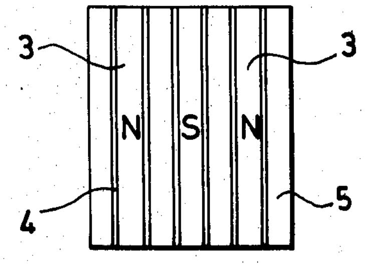
Figure 1C:
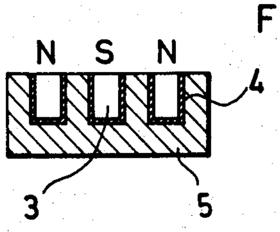
Figure 2B:
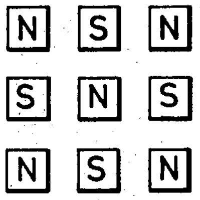
Figure 1D:
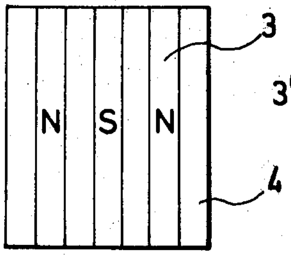
Figure 1E:
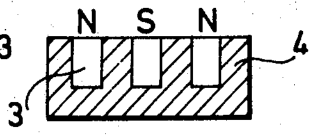
Figure 2C:
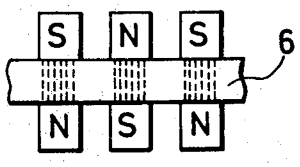
Figure 1G:
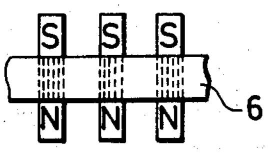
Figure 2D:
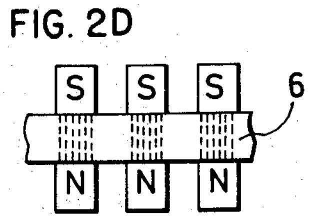
Figure 1F:
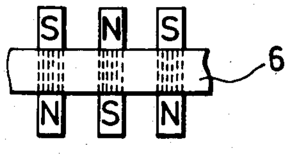

In accordance with the present invention, high-sensitivity pressure sensitive conductors are obtained in which high-sensitivity pressure sensitive conductor portions and insulator portions or low-sensitivity pressure sensitive, conductor portions coexist and through which a current can flow readily either (1) in the thickness direction or (2) in the direction parallel to the major surface of the conductor.

A pressure sensitive conductor of the type (1) is, by way of exemple, shown schematically in FIGS. 1 (I), 2 (I), 3 (I), (II), and 4 (I), (II). In all of these figures, the numeral 1 designates high-sensitivity pressure sensitive conductor portions in which there is a high concentration of dispersed electrically conductive magnetic particles. The numeral 2 designates insulator portions or low-sensitivity pressure sensitive conductor portions.

The pressure sensitive conductor shown in FIG. 1 (I) is fabricated by using electromagnetic chucks as in FIGS. 1 (II), (III), (IV) and (V). Each chuck comprises bar magnets 3 and magnet containers 4 of a non-magnetic substance such as brass, and, in the case of FIGS. 1 (II), (III), core 5 of a magnetic substance such as iron.

When two such electromagnetic chucks are placed on opposite sides of a conductor sheet 6, with different poles facing across the sheet, lines of magnetic force will develop between the opposing poles S and N. Accordingly, the conductive magnetic particles in the sheet are concentrated and dispersed along the lines of magnetic force.

Arranging the magnets as indicated in FIG. 1 (VI) will distribute the conductive magnetic particles in more uniform concentration than is possible when the magnets are disposed as in FIG. 1 (Vii). The former is, therefore, preferred.

The pressure sensitive conductor shown in FIG. 2 (I) is fabricated by means of electromagnetic chucks, each comprising a plurality of magnet chips arranged in a square formation. When two such chucks are placed on both sides of a conductor sheet as in FIGS. 2 (III), (IV), the conductive magnetic particles will be concentrated and distributed between the opposing magnets, thus forming a pressure sensitive resistor having high-sensitivity pressure sensitive conductor portions as illustrated in FIG. 2 (I). The alternate N-S arrangement in FIG. 2 (III) will make the dispersion of the conductive magnetic particles more uniform than the arrangement in FIG. 2 (IV), and is preferred.

Figure 4A:
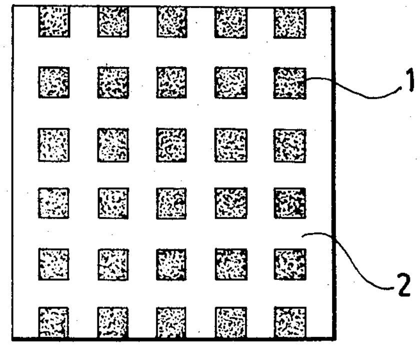
Figure 3A:
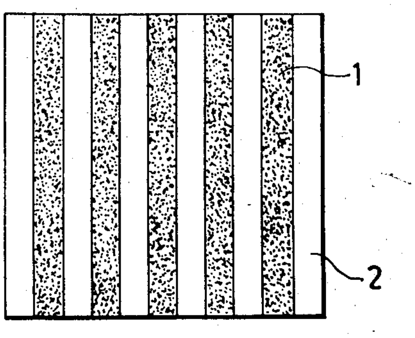
Figure 4B:
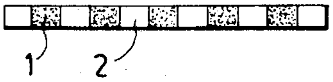
Figure 3B:
Figure 5A:
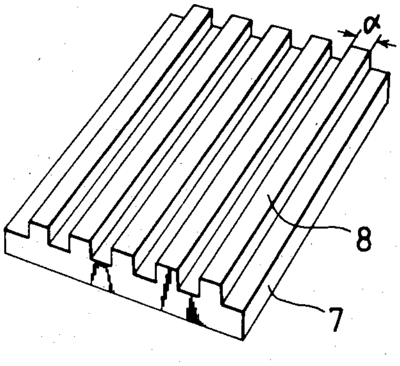
Figure 5B:
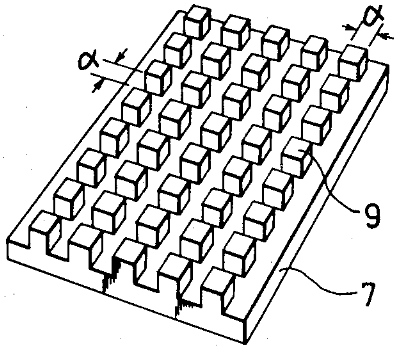

FIGS. 5 (I), (II) show magnetic pole pieces used in fabricating the pressure sensitive conductors of FIGS. 3 (I), (II) and FIGS. 4 (I), (II), respectively. In both figures, the numeral 7 indicates a pole piece substrate, 8 indicates a plurality of parallel ridges, and 9 indicates a plurality of regularly spaced protuberances.

Desirably, the pole pieces are made of a material that will not produce residual magnetism under the influence of magnetic fields. The preferred construction material is soft iron. The pole pieces can be easily produced by conventional milling procedures.

The pitch or distance $\alpha$ between the protrusions on a pole piece should be greater than the thickness of the conductor sheet to be handled. If the distance $\alpha$ is less than the sheet thickness, the boundaries between conductor and insulator portions will tend to become indistinct, and the resulting sheet will sometimes fail to give a satisfactory result in a withstand voltage test.

The pole piece is usually used with the spaces between its protrusions filled with a nonmagnetic substance to provide a flush and smoothened surface. Alternatively, an unfilled pole piece may be used. In such a case, it is preferred to interpose a smooth mold of nonmagnetic substance between the piece and the conductor sheet.

Figure 6:
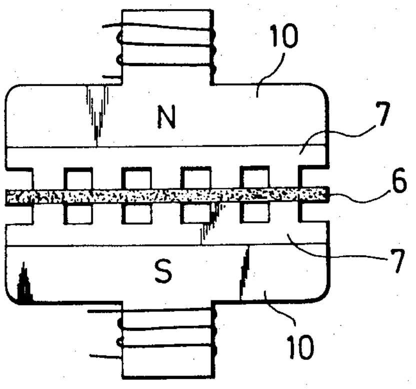

In fabricating a pressure sensitive conductor with use of such pole pieces, as illustrated in FIG. 6, a conductor sheet 6 is sandwiched between a pair of the pieces 7, for example, shown in FIG. 5 (I) or (II). Further, a pair of electromagnets 10 are placed on the outer sides of the pole pieces, so that the sheet 6 is subjected to the action of parallel magnetic fields through the pole pieces 7. The pole piece 7 may be provided as a unit with the electromagnets 10. It is preferably detachably connected to the electromagnets 10 so that pole pieces of the required pattern can be replaced in a suitable manner. Then a pressure sensitive conductor sheet having pressure sensitive conductor portions 1 and insulator portions 2 in any desired pattern may be formed. Clearly, the pattern of the product will be determined by the pattern of the pole pieces.

Figure 7A:
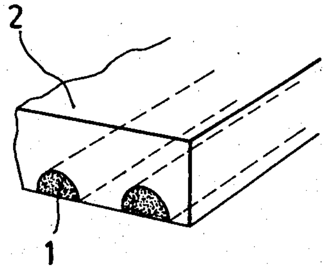
Figure 7B:
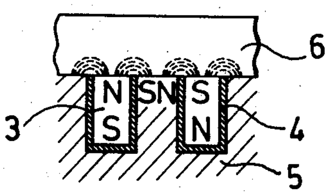
Figure 7C:
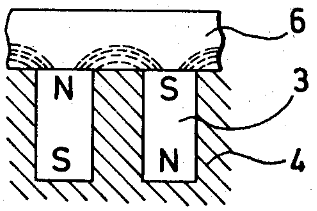

The pressure sensitive conductor of the type (2) is schematically shown, by way of exemplification, in FIGS. 7 (I) and 8 (I). Throughout these figures, the numeral 1 indicates high-sensitivity pressure sensitive conductor portions, and the numeral 2 indicates insulator portions or low-sensitivity pressure sensitive conductor portions.

To fabricate the pressure sensitive conductor illustrated in FIG. 7 (I), an electromagnetic chuck shown in FIG. 1 (II), (III) or FIGS. 1 (IV), (V) in contact with one side of a conductor sheet. Then, as can be seen from FIG. 7 (II) or (III), N and S poles are formed on both sides of each wall of the brass magnet container 4. This results in concentrated dispersion of the conductive magnetic particles along the lines of magnetic force as shown.

Figure 8A:
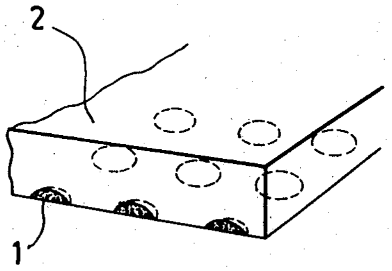
Figure 8B:
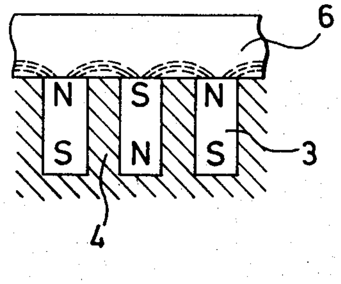

The pressure sensitive resistor shown in FIG. 8 (I) is fabricated by placing the electromagnetic chuck of the magnet pattern in FIG. 2 (II) on one side of a conductor sheet 6, since the former creates lines of magnetic force in the latter between the N and S poles and permits concentrated dispersion of the conductive magnetic particles therealong.

Thus, according to this invention, magnetic metal particles will be concentrated and distributed only in the portions of the sheet where high sensitivity is required. Moreover, the resulting sheet may be designed to permit selectivity in the direction of current flow upon application of pressure. By the practice of the invention, various inexpensive, high performance, pressure sensitive conductors can be obtained while taking full advantage of the properties of the elastomer by mixing a smaller amount of magnetic particles in the elastomer than when merely parallel magnetic fields are employed. Among additional advantages of industrial importance are that the use of the smaller quantity of magnetic particles decreases the specific gravity of the pressure sensitive conductor, increases the resistance of the conductor to repeated pressure application, and reduces the material cost. In fact, by the practice of this invention, it is possible to produce pressure sensitive conductors using quantities of particles which are so low that the product would not function as a conductor if produced by prior known procedures.

The sheet of wide surface areas obtained by the method of the invention have many applications, including multipoint input plates, electric field seals, and various pressure-electric signal conversion devices.

More points of actuation may be incorporated in the same area by shortening the pitch or distance between the high-sensitivity pressure sensitive conductor portions and the insulator portions or low-sensitivity pressure sensitive conductor portions. This is among the features of the invention, and one of its major commercial advantages.

The present invention may also be employed in the field of microelectronics. The products of fast-developing electronics industry, that is, the electron devices with very high degress of integration, such as LSI and liquid crystal elements are usually connected by soldering or by mechanical fitting. When the elements are joined by soldering, they are temporarily exposed to heat that sometimes damages their functions or affects their characteristics unfavorably. Moreover, because the contact-to-contact distance is only a few millimeters, great skill is required for the soldering. With mechanical connections, vibration can separate the elements and, often the contacts are subject to corrosion.

An elastomer sheet, obtained by this invention, having current-carrying circuits formed only in the thickness direction, can connect a multiplicity of contact points utilizing only a one-piece construction, and is capable of conducting a current upon application of pressure so as to reduce the contact resistance. With these features, the sheet is suited for the connection of the miniature devices employed in microelectronics, such as LSI, luminescent diode, IC, and liquid crystal elements. The invention thus provides elements which are excellent for use in such applications as electronic-eye cameras, electronic digital-display watches, desktop calculators, and computer keyboards.

Electrically conductive magnetic particles useful for the practice of the invention include those normally employed with conventional elements such as iron, nickel, cobalt, and their alloys. Iron, nickel and alloys of either metal are preferred because of the availability at low cost. The conductive magnetic particles may range in size from 0.01 to 200 μm. Taking the hardness and resistance to repeated pressure application of the resulting pressure-sensitive conductor into consideration, a particle size in the range from 0.1 to 100 μm is preferred.

In the method of the invention, the amount of conductive magnetic particles used is between 3 and 40% by volume based on the total volume of the mixture. If less than 3% by volume is employed, the product is either an insulator or a pressure-sensitive conductor with a breakdown current which is so low as to be impractical. On the other hand, an amount in excess of 40% by volume provides pressure sensitive conductors which are hard and have minimum resistance to the rigors of repeated deformation. Moreover, they tend to be conductive even without the application of pressure.

Among useful insulating elastomers for use in the invention, polybutadiene, natural rubber, polyisoprene, SBR, NBR, EPDM, EPM, urethane rubber, polyester rubber, chloroprene rubber, epichlorohydrin rubber, and silicone rubber may be mentioned by way of example. Where weatherability is a problem, the preferred rubbers will have a minimum of carbon-carbon unsaturation. From the viewpoints of weatherability, heat resistance, and electric characteristics, silicone rubber is the presently preferred elastomer.

For the preparation of the products of the invention, the viscosity of the mixture of a conductive magnetic material and elastomer is normally, prior to curing, from $10^4$ and $10^7$ poises at a rate of strain of $10^{-1}sec^{-1}$. If the viscosity is appreciably less than $10^4$ poises, the dispersion characteristics of the conductive magnetic particles may be unsatisfactory. Conversely, if the viscosity appreciably exceeds $10^7$ poises, the orientation of the magnetic particles in the applied magnetic fields may be too slow for practical production speeds.

In addition to the magnetic particles, the elastomer may contain other fillers, for example, up to about 30% by volume of a filler, such as colloid silica, silica aerogel, kaolin, mica, talc, wollastonite, calcium silicate, aluminum silicate, chalk, calcium carbonate, iron oxide, or alumina. If a filler is employed, however, the durability, compression set, and electrical properties of the conductor may be adversely affected. Nevertheless, when the metal powder is to be mixed with rubber in the liquid form, the addition of a suitable amount of such a filler is desirable in that it prevents rearrangement of the metal particles.

What has been described is a pressure sensitive conductor comprising an elastomer in which there is dispersed from about 3% to 40% by volume, based on the total volume of electrically conductive magnetic particles having a particle size from about 0.01 μm to 200 μm. The particles are distributed throughout the elastomer so as to be concentrated in selected portions thereof in the form of a predetermined pattern. Those segments or portions of the conductor where there is a relatively high concentration of particles comprise high sensitivity conductor portions. Its segments or portions where there is a relatively small volume of particles or substantially no particles are insulator portions. The conductor and insulator portions may take any of a wide variety of shapes. Thus, for example, the shapes may be parallel strips extending the length of the conductor or they may be separate geometric shapes, such as squares, circles, triangles and the like. The segments where the particles are concentrated may extend through the total thickness of the conductor or through some lesser portion thereof, depending upon the intended use. The arrangement may be either symmetrical or nonsymmetrical. In addition to the magnetic particles, the conductor may contain any of a large variety of other fillers as disclosed above.

The conductors are produced by first forming a mixture in which the particles are dispersed in a curable elastomer, the elastomer and concentration of particles being selected so that the viscosity is from about $10^4$ to $10^7$ poises at a strain rate of $10^{-1}sec^{-1}$. The mixture is formed into a sheet for curing. Curing is effected by standard procedures, suitably with the use of a cross linking agent, while subjecting the sheet to the action of a magnetic field or after subjecting the sheet to the action of a magnetic field.

The following non-limiting examples are given by way of illustration only.

EXAMPLE 1

Fourteen percent by volume of nickel powder, obtained by thermal decomposition of nickel carbonyl and having a particle size ranging from 1 to 3 μm; and 86% by volume of condensation reaction type silicone rubber ("KE-12RTV" made by Shin-etsu Chemical Industry Co.) were mixed with cross linking catalyst on a kneader for 5 minutes, and the mixture was formed into a sheet one millimeter thick. Twenty minutes after the conclusion of mixing, it was subjected to magnetic fields. The viscosity $\eta$ of the sheet at this point was determined to be $10^{5.9}$ poises on the assumption that $f=\eta\gamma$, where $\gamma$ is the rate of strain which was $10^{-1}sec^{-1}$ and $f$ was the stress as measured by a Weissenberg rheogonimeter (viscometer). The sheet was subjected to magnetic fields from both sides by electromagnetic chuck as shown in FIGS. 1 (IV), (V) of up to 1000 gauss arranged so that the center-to-center distance between their S and N poles was 10 mm and each of the poles was 5 mm wide. Three minutes later, the magnets were removed, and the sheet was allowed to stand for one full day, and then it was heat treated at 120° C. for 2 hours to cure the elastomer. A pressure sensitive conductor was thus obtained.

As a reference example, a 1 mm-thick sheet was similarly formed, and it was allowed to stand for one full day without being subjected to magnetic fields, and finally cured at 120° C. for 2 hours. The cross-linked sheet thus obtained was nonconductive. In subsequent tests, the nickel percentage was increased by degrees up to 22%, when finally a pressure sensitive conductor resulted.

Figure 9:
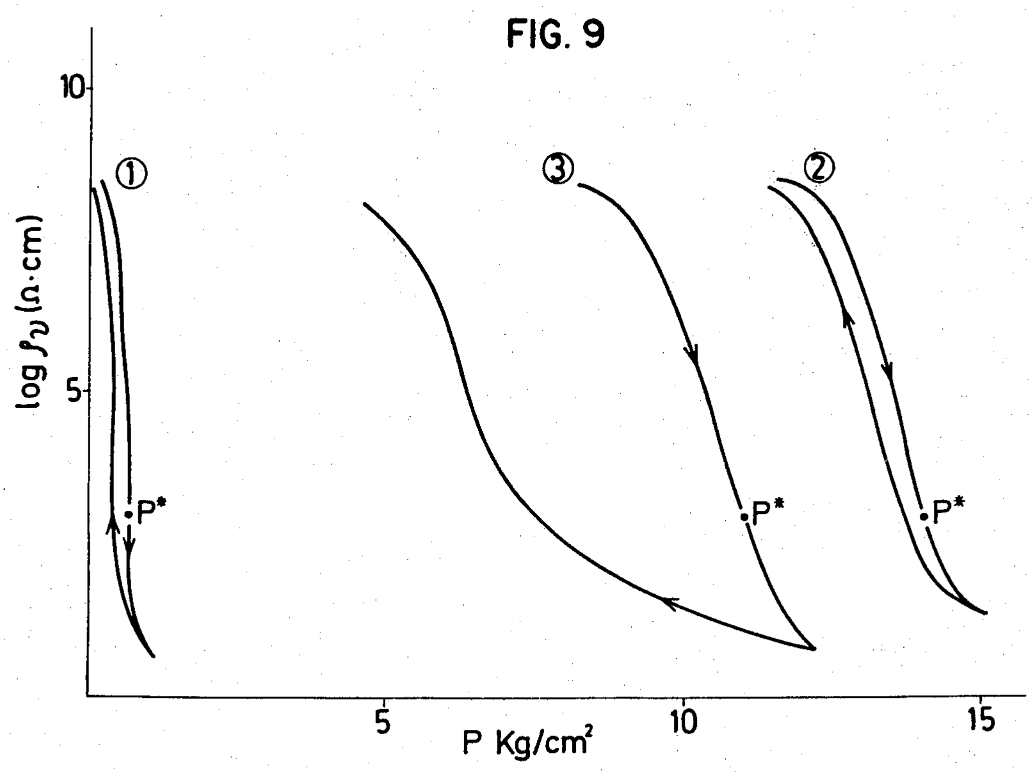
FIG. 9 is a graph showing the relations between compressive forces or pressures (P) and volume resistivities ($\rho_v$)

Test portions of the sheet of Example 1 that had been formed in contact with the magnets or between and out of contact with the magnets, and a test piece of the reference example were subjected to compressive force or pressure P of varying magnitudes (in kg/cm²), and the relations between the pressure and volume resistivities $\rho_v$ (in Ω·cm) were determined. The results are graphically represented in FIG. 9. As can be seen, the test portion (1) that had been formed in contact with the magnets in Example 1 manifested a decrease in volume resistivity from more than $10^7$Ω·cm to $10^3$Ω·cm upon application of a pressure of 0.7 kg/cm², whereas the portion (2) that had been between and out of contact with the magnets attained a volume resistivity of $10^3$Ω·cm upon application of a pressure of 14 kg/cm² (the pressure being hereinafter referred to as P*). With the test piece (3) of the reference example, P* was 11 kg/cm² despite the large quantity of nickel particles. It will be also seen from FIG. 9 that the hysteresis of resistance of the portion that had been in contact with the magnets is far less than that of the reference example.

The test portions of Example 1 that had been in or out of contact with the magnets and the test piece obtained by the reference example were repeatedly subjected to a pressure high enough to convert them from an insulator to a conductor, or a nonductive to a conductive state a total of 100,000 times. For each test piece, the pressure P* (in kg/cm²)required to be applied so that each test sheet had a volume resistivity of $10^3$ Ω·cm was determined. The results are summarized in Table 1.

TABLE 1

| Test Piece | Changes of P* with Repeated Pressure Application (in kg/cm²) — No. of Pressure Applications: Under 10 | 100,000 |
|---|---|---|
| Portion (1) of Example 1 | 0.7 | 1.2 |
| Portion (2) of Example 1 | 14 | 15 |
| Reference Example (3) | 11 | 18 |

Further, the test pieces of Example 1 and that of the reference example were placed on 1 mm-wide print wirings arranged at intervals of 1 mm on a polyester substrate. Compressive force was applied to each test piece in the direction of its thickness, and the pressure required to attain a resistance of 10 Ω was determined. The values thus obtained were 0.9, 20, and 14 kg/cm², respectively. This indicates that the test portion of Example 1 that had been formed by contact with magnets proved highly sensitive, permitting the current flow in the direction normal to the direction where the pressure was applied.

EXAMPLE 2

Forty percent by volume of iron powder, each particle having a major diameter of 100 μm and a minor diameter of 10 μm, 60% by volume of polybutadiene glycol having a molecular weight of about 3500, and a small amount of tolylene diisocyanate were mixed. The mixture was allowed to react in a nitrogen atmosphere at 70° C. for 4 hours, and then formed into a 2 mm-thick sheet which was then defoamed. Following the reaction at 120° C. for 30 minutes, in the same manner as in Example 1, the sheet was sandwiched between magnetic chucks in which N and S poles of up to 200 gauss were embedded. After standing for 10 minutes, the magnet plates were removed, and the sheet was allowed to react in a nitrogen atmosphere at 120° C. for 2 hours to produce a pressure sensitive conductor.

As a reference example, a test sheet was similarly prepared, except that it was not subjected to a magnetic field. It was an insulator.

The 2 mm-thick sheets of pressure sensitive conductors obtained in this example were tested. Sheet (1) was formed in contact with the magnets and sheet (2) was formed between or out of contact with the magnets. The pressures P* (kg/cm²) required for each sheet in order to attain reductions of their volume resistivities to $10^3$Ω·cm in the direction of thickness and in the direction parallel to their planes are shown in Table 2.

TABLE 2

| Test sheet | Pressures P* (kg/cm²) Required by the Test Sheets of Example 4: (1) | (2) | Ref. Ex. |
|---|---|---|---|
| In direction of thickness | 5.7 | 11.5 | >50 |
| In direction parallel to planes | 6.5 | 10.2 | >50 |

EXAMPLE 3

Twenty percent by volume of nickel particle (manufactured by Sherritt Gordon Co.) having an average particle size of 50 μ, 80% by volume of an addition type silicone rubber ("KE1300RTV" made by Shin-etsu Chemical Industry Co.), and a cross-linking catalyst were mixed on a kneader for 20 minutes. The mixture was formed into a 0.5 mm-thick sheet as a laminate between 0.05 mm-thick polyester films. The laminate was placed between a pair of pole pieces as shown in FIG. 5 (I), and was allowed to stand at 40° C. for 2 hours for cross linking while being subjected to parallel magnetic fields of 2000 gauss produced by electromagnets as in FIG. 6.

Figure 10:
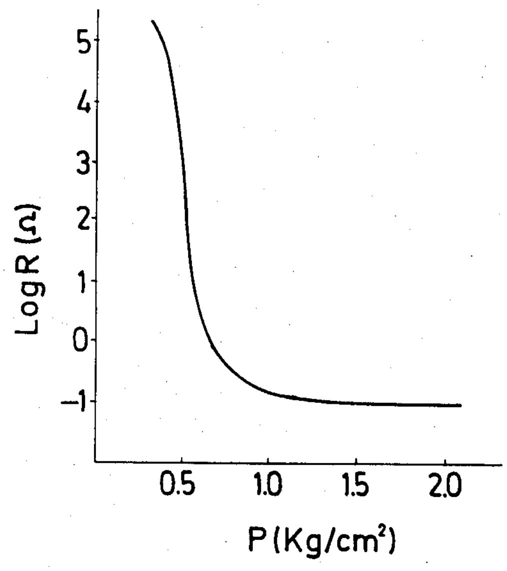
FIG. 10 is a graph showing the relations between pressures (P) and resistances (R) of a pressure-sensitive conductor portion on an embodiment of the invention.

The sheet of a pressure sensitive, conductive elastomer thus obtained had pressure sensitive conductor portions and insulator portions distinctly separated from each other. The relationship between the pressure and the resistance of the pressure sensitive conductor portions was as represented by the curve in FIG. 10. The resistance of the insulator portion was more than $10^9$Ω, and its voltage resistance was over 1500 V.

Figure 11:
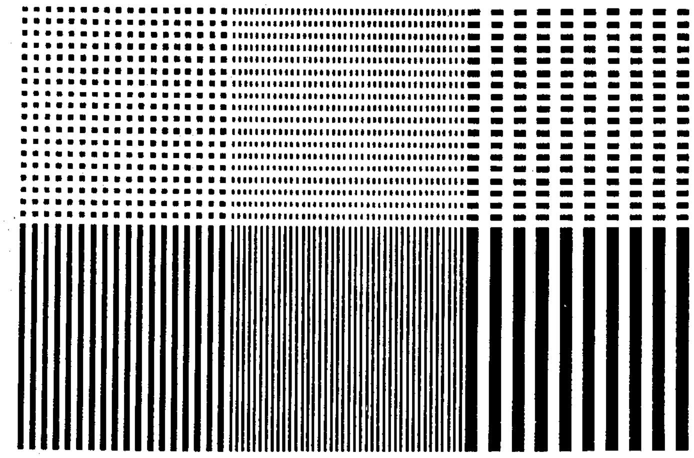
FIG. 11 is a plan view of a conductor sheet having six different patterns of pressure-sensitive conductor and insulator portions.

FIG. 11 illustrates an example of a conductive elastomer having six different patterns formed by using a milling machine and pole pieces of corresponding patterns. Shown in black are pressure sensitive conductor dots or lines, and blank areas are insulative areas.

EXAMPLE 4

Eight percent by volume of nickel powder made of nickel carbonyl and ranging in particle size from 0.1 to 1 μm, and 92% by volume of a specially prepared addition reaction type silicone rubber, which was equivalent to Shin-etsu Chemical Industry's silicone rubber "KE1300 RTV" in molecular weight and other properties but was reduced in pot life to about one hour, were mixed on a motor-driven grinder for 5 minutes. The mixture was formed into a 1 mm-thick sheet and, at a viscosity in the vicinity of $10^{6.5}$ poises, it was subjected to magnetic fields for one minute. The magnetic fields were applied from the underside of the sheet by using a magnet chuck of up to 1000 gauss arranged as indicated in FIG. 7 (III) so that the distance between the centers of the S and N poles was 8 mm and the width of each pole was 5 mm. After standing for one minute under the influence of magnets, the magnets were removed. After standing for one full day, the sheet was heat treated at 120° C. for 2 hours, and a pressure sensitive conductor was formed.

As a reference example, a 1 mm-thick sheet was similarly obtained with the exception that it was not subjected to any magnetic field. The portion (1) of the sheet of Example 4 that had been formed between and out of contact with the magnets, the portion (2) of the same sheet that had been in contact with the magnets, and the test piece (3) of the reference example were placed on the printed wirings over the same polyester substrate as used in the preceding example, and the relations between the pressures P and resistances (Ω) were examined. Here the current passed in parallel with the surface of the test sheet or portion.

The compressive forces or pressures (kg/cm²) that the test piece (1), (2), and (3) required to attain a resistance of 10 Ω each were determined. The values so obtained are given in Table 3.

TABLE 3

| Test piece | (1) | (2) | (3) |
|---|---|---|---|
| Pressure (kg/cm²) | 2.3 | 12.7 | >50 |
| Voltage resistance (V) | 6.8 | 6.5 | — |
| Current resistance (A) | 0.8 | 0.6 | — |

The test piece (3) which was not subjected to a magnetic field was an insulator. With variation in the voltage between terminals, each 1 mm-thick test piece and a fixed resistance of 16.7 Ω were connected in series, and the voltage and current were changed. The current and voltage values at which the voltage in each current vs. voltage curve of each test piece remained the same despite repeated application of the current and voltage until the peak was reached.

What is claimed is:

1. In a method for the manufacture of a pressure sensitive conductor comprising an insulating elastomer having dispersed therein from about 3% to 40% by volume based on the total volume of electrically conductive magnetic particles having a particle size of from 0.01 μm to 200 μm, the said particles being concentrated and distributed in portions of the conductor in accordance with a selected pattern in which those portions having a relatively high concentration of particles are high sensitivity conductor portions and other portions are insulator portions;

the improvement comprising first forming a mixture containing said elastomer and said particles, forming said mixture into a sheet having a viscosity of from $10^4$ to $10^7$ poises at a strain rate of $10^{-1}$ sec.$^{-1}$, subjecting said sheet to the action of shaped magnets forming a magnetic field of a selected pattern, and thereafter curing said elastomer.

2. A method in accordance with claim 1, wherein said magnets are disposed on one side of said sheet, with the N and S poles thereof alternately in contact with said side.

3. A method in accordance with claim 1, wherein said magnets are disposed on one side of said sheet, with the N and S poles thereof alternately in contact with said side, and corresponding magnets are disposed on the other side of said sheets, with the S and N poles thereof alternately in contact with said side and opposite to said poles on said one side.

4. A method in accordance with claim 1, wherein said magnets are disposed on one side of said sheet, with only the N poles thereof in contact with said one side, and corresponding magnets are disposed on the other side of said sheet, with only the S poles thereof in contact with said other side.

5. A method in accordance with claim 1, wherein said magnets each has a pole face from 1 to 25 mm in width.

6. A method in accordance with claim 5, wherein the magnets are each in the form of a square with sides from 1 to 25 mm in length.

7. A method in accordance with claim 5, wherein the magnets are each in the form of a circle with a diameter of from 1 to 25 mm.

8. A method in accordance with claim 1, wherein said shaped magnets are in the form of a plurality of parallel ridges rising from a base and separated by parallel recesses.

9. A method in accordance with claim 8, wherein the distance between said ridges is greater than the thickness of the said sheet.

10. A method in accordance with claim 8, wherein said recesses are filled with a non-magnetic material.

11. A method in accordance with claim 1, wherein said shaped magnets are arranged in the form of rows of protuberances rising from a base and separated by recesses.

12. A method in accordance with claim 11, wherein said protuberances are in the shape of squares.

13. A method in accordance with claim 11, wherein said protuberances are in the shape of circles.

14. A method in accordance with claim 11, wherein the distance between said protuberances is greater than the thickness of said sheet.

15. A method in accordance with claim 11, wherein said recesses are filled with a non-magnetic material.

* * * * *